(12) United States Patent
Flockhart et al.

(10) Patent No.: US 6,563,920 B1
(45) Date of Patent: May 13, 2003

(54) METHODS AND APPARATUS FOR PROCESSING OF COMMUNICATIONS IN A CALL CENTER BASED ON VARIABLE REST PERIOD DETERMINATIONS

(75) Inventors: Andrew Derek Flockhart, Thornton, CO (US); Robin H. Foster, Little Silver, NJ (US); Joylee E. Kohler, Northglenn, CO (US); Eugene P. Mathews, Barrington, IL (US); John Z. Taylor, Bedminster, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/461,904

(22) Filed: Dec. 15, 1999

(51) Int. Cl.[7] ............................................... H04M 3/00
(52) U.S. Cl. .............................. 379/265.1; 379/265.11; 379/265.12; 379/265.14; 379/265.01; 379/265.03; 379/265.06
(58) Field of Search ....................... 379/265.12, 265.02, 379/265.04, 266.02, 266.03

(56) References Cited

U.S. PATENT DOCUMENTS

| | | | | |
|---|---|---|---|---|
| 5,206,903 | A | | 4/1993 | Kohler et al. .......... 379/265.02 |
| 5,905,793 | A | | 5/1999 | Flockhart et al. ...... 379/266.06 |
| 6,044,355 | A | * | 3/2000 | Crockett et al. ....... 379/265.05 |
| 6,278,978 | B1 | * | 8/2001 | Andre et al. .................... 705/9 |

OTHER PUBLICATIONS

"CentreVu® Virtual Routing: Cost–Effective Multisite Routing That Delivers Calls to the Best Place, the First Time," Lucent Technologies Inc., pp. 1–4, Aug. 1998.
"CentreVu® Advocate: The Revolutionary Routing Solution That Makes the Best Decision Every Time, Automatically," Lucent Technologies Inc., pp. 1–4, Aug. 1998.
J.P. Anderson et al., "Uncovering Maximum Leverage in Call Center Performance," Call Center Management, pp. 1–3, 1998.
"Lucent Technologies CentreVu® Call Center Solutions: CentreVu Virtual Routing," Lucent Technologies Inc., pp. 1–2, 1998.
"Lucent Technologies CentreVu® Call Center Solutions: CentreVu Advocate," Lucent Technologies Inc., pp. 1–2, 1998.
BCS Public Relations Press Releases, "Lucent Technologies Unveils Breakthrough Call Center Software That Improves Customer Care, Increases Sales and Reduces Costs: Predictive Algorithms Change Call Center Paradigm by Bringing Agent to Caller," Call Center '98, Dallas, Texas, pp. 1–3, Feb. 4, 1998.
"CentreVu® Advocate[SM] Research Simulation: Environments with CentreVu Advocate," Lucent Technologies Inc., pp. 1–3, 1998.
"Lucent's CentreVu® Advocate: Breakthrough Solutions for Success," Lucent Technologies Inc., pp. 1–4, 1998.

* cited by examiner

Primary Examiner—Ahmad F. Matar
Assistant Examiner—Karen Le
(74) Attorney, Agent, or Firm—Ryan, Mason & Lewis, LLP

(57) ABSTRACT

A call center is configured to determine variable rest periods for one or more agents, based at least in part on factors such as call center service state and agent occupancy. The call center service states may include a number of designated service states associated with a particular skill or type of communication supported by one or more agents of the call center. A particular one of the states represents a branded service level, while other states represent over-service and under-service conditions. The rest period determined for one or more of the agents can be used to implement features such as many-to-many work assignment, just-in-time (JIT) delivery of work, next opportunity for service (NOS) indicators, thereby facilitating the processing of communications in the call center.

37 Claims, 2 Drawing Sheets

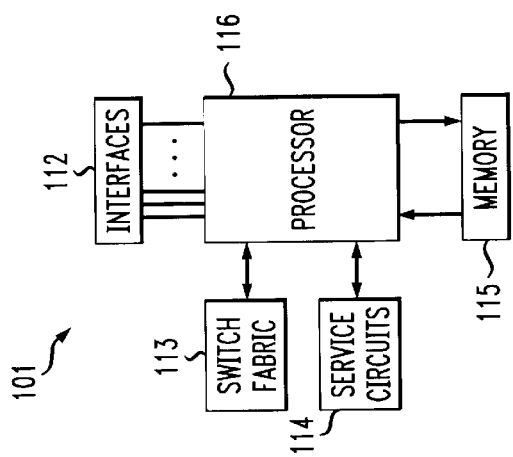
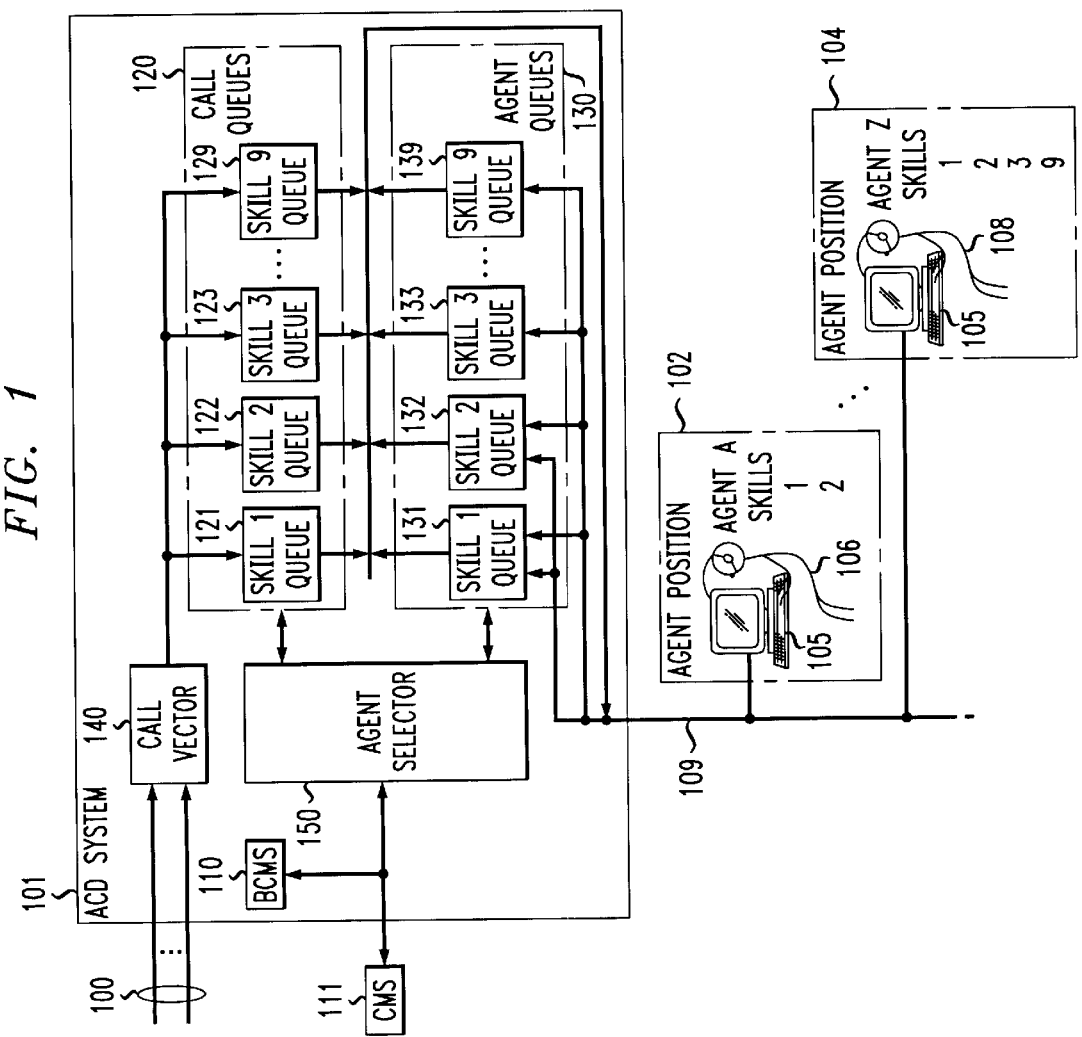

METHODS AND APPARATUS FOR PROCESSING OF COMMUNICATIONS IN A CALL CENTER BASED ON VARIABLE REST PERIOD DETERMINATIONS

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available service agents in accordance with various predetermined criteria. Existing call centers suffer from a number of drawbacks. For example, as will be described in greater detail below, such centers are generally unable to provide satisfactory techniques for variable rest periods, many-to-many work assignments, just-in-time (JIT) delivery of work, and next opportunity for service (NOS).

With regard to variable rest periods, a call center must be attentive to both the needs of callers and the needs of agents. In some situations, the needs of a caller outweigh the needs of the agent and in other situations the needs of the agent outweigh the needs of the caller. It is therefore necessary that the call center have a convenient way to represent and activate rules that protect an agent from burn-out or heavy workload while also protecting a caller from long wait times.

It is well known that the overall performance of a call center is highly dependent upon the efficiency and effectiveness of the agents. Efficiency and effectiveness are believed to improve in call centers where workload is distributed fairly and situations that create burn-out are minimized. Nonetheless, a typical practice used in conventional call centers is to assign a given available agent to a waiting call, even if the given agent has been carrying a far greater workload than other agents in the same peer group, and even if the call in queue could wait longer and still be considered well served.

Some existing call centers can provide variable agent rest periods using a feature known as "Timed ACW," which puts an agent into an After Call Work (ACW) state for a specified period of time. However, in implementing such a rest period using this feature there is generally no consideration of the current performance conditions of the call center or a particular skill at the time the rest period takes place.

With regard to work assignment, call centers have typically utilized either a one-to-many process or a many-to-one process. In a one-to-many process, a single call arrives and the process chooses among "many" agents currently available to handle that call. In a many-to-one process, a single agent becomes available when many calls are in queue, and the process chooses which one of the "many" calls the agent should take. Existing call centers can evaluate the consequences of each work assignment, taking into account predictions on how the calls not taken from queue will fare or how the various available agents compare in workload so that fairness is taken into account. However, such centers are generally unable to provide a more efficient many-to-many work assignment, i.e., a process in which a set of multiple calls are considered simultaneously for distribution to multiple agents.

With regard to JIT delivery of work, in a call center operating in a distributed work environment, e.g., a business enterprise that includes multiple geographically-dispersed sites, the information and communication elements needed to perform a particular task are often stored or waiting in locations distant from an agent who has been assigned the task. For example, a call assigned to an agent may need to be transferred to the agent from a remote or centralized site and the data associated with the call may need to be retrieved from a remote or centralized server. It is known from the operation of call centers in such distributed environments that significant delays can result when calls and data held in one location are delivered to agents in another location. For example, it may take up to several seconds for an agent to establish the necessary connections and obtain the data required to handle the call. This type of delay is clearly undesirable, and represents a significant loss of productivity.

NOS represents knowledge of upcoming and scheduled availability of agents who are presently on a break or other rest period of defined duration. With regard to NOS, call centers are generally moving from a reactive operation based on historical metrics or measurements to predictive operations based on the ability to predict future events and evaluate consequences of individual operational decisions. Certain call centers now include software enabling the calculation of a predictive outlook for a head call in any queue in order to determine when the call might be handled by an agent other than the one currently available. For example, some call centers use a metric known as Predicted Wait Time (PWT). The PWT measure incorporates a Weighted Advance Time (WAT), which is a predictive outlook on when a call will likely be served by an agent. Although such predictive outlooks can be made more accurate if based on better information regarding agent availability, existing call centers are generally unable to provide such information, and are therefore deficient in terms of NOS capability.

As is apparent from the foregoing, a need exists for improved techniques for providing features such as variable rest periods, many-to-many work assignment, JIT delivery of work, and NOS indicators in a call center.

SUMMARY OF THE INVENTION

The invention provides methods and apparatus which improve the processing of calls or other communications in a call center. More particularly, the invention in an illustrative embodiment provides techniques for implementing variable rest periods, many-to-many work assignment, just-in-time (JIT) delivery of work, and next opportunity for service (NOS) indicators.

In accordance with a first aspect of the invention, a call center is configured to determine variable rest periods for one or more agents, based at least in part on factors such as call center service state and agent occupancy. The call center service states may include a number of designated service states associated with a particular skill or type of communication supported by one or more agents of the call center. A particular one of the states represents a branded service level, while other states represent over-service and under-service conditions. For example, the service states may include an over threshold state, a current jeopardy state, a future jeopardy state, a within-range state, an over served state, a queue empty state and an agents idle state, wherein the within range state is representative of the particular service level. The agent occupancy levels may include, e.g., a below target range level, a within range level, and an above target range level.

In an illustrative embodiment, the rest period is determined for the given agent based on both the agent occupancy level and a worst-case one of the service states for one or more skills supported by the agent. More particularly, a different set of rest periods is associated with each of the service states for each of plurality of agent occupancy levels, such that the rest period is determined for the given agent by determining a particular agent occupancy level and a worst-case service state among the service states corresponding to skills supported by the agent. The determined rest period for the given agent provides a precise time of future availability of that agent.

In accordance with a second aspect of the invention, the rest period determined for one or more of the agents can be used to implement a many-to-many work assignment feature in which multiple agents are each considered simultaneously for handling multiple waiting communications.

In accordance with a third aspect of the invention, a JIT delivery of work feature is provided in which the precise time of future availability of the agent as determined based on the rest period is used to schedule at least one event prior to delivery of a particular communication to that agent. Such events may include, e.g., a call selection event, a data retrieval event and a call connection event. These events are scheduled such that data required to process the particular communication is provided to the agent substantially simultaneously with the communication.

In accordance with a fourth aspect of the invention, the precise time of future availability of the agent is used to determine a NOS indicator for each of at least a subset of the skills supported by the agent. Such NOS indicators generated for at least a subset of the plurality of agents associated with the call center may be arranged in a visual display in the form of a time line of NOS indicators for a given skill supported by the agents. Several NOS time lines of this type may be displayed simultaneously, each including NOS indicators for a particular skill supported by at least a subset of the agents. NOS information generated in accordance with the invention may also be made available to call selection and agent selection algorithms.

By providing more accurate information regarding agent availability, the present invention overcomes the above-described drawbacks of conventional call centers, and provides substantially improved processing of calls and other communications. These and other features and advantages of the present invention will become more apparent from the accompanying drawings and the following detailed description.

BRIEF DESCRIPTION OF THE DRAWINGS

FIG. 1 is a block diagram of a call center in which one or more aspects of the present invention may be implemented.

FIG. 2 is a block diagram of an automatic call distribution (ACD) system implemented in the call center of FIG. 1.

DETAILED DESCRIPTION OF THE INVENTION

Figure 3:
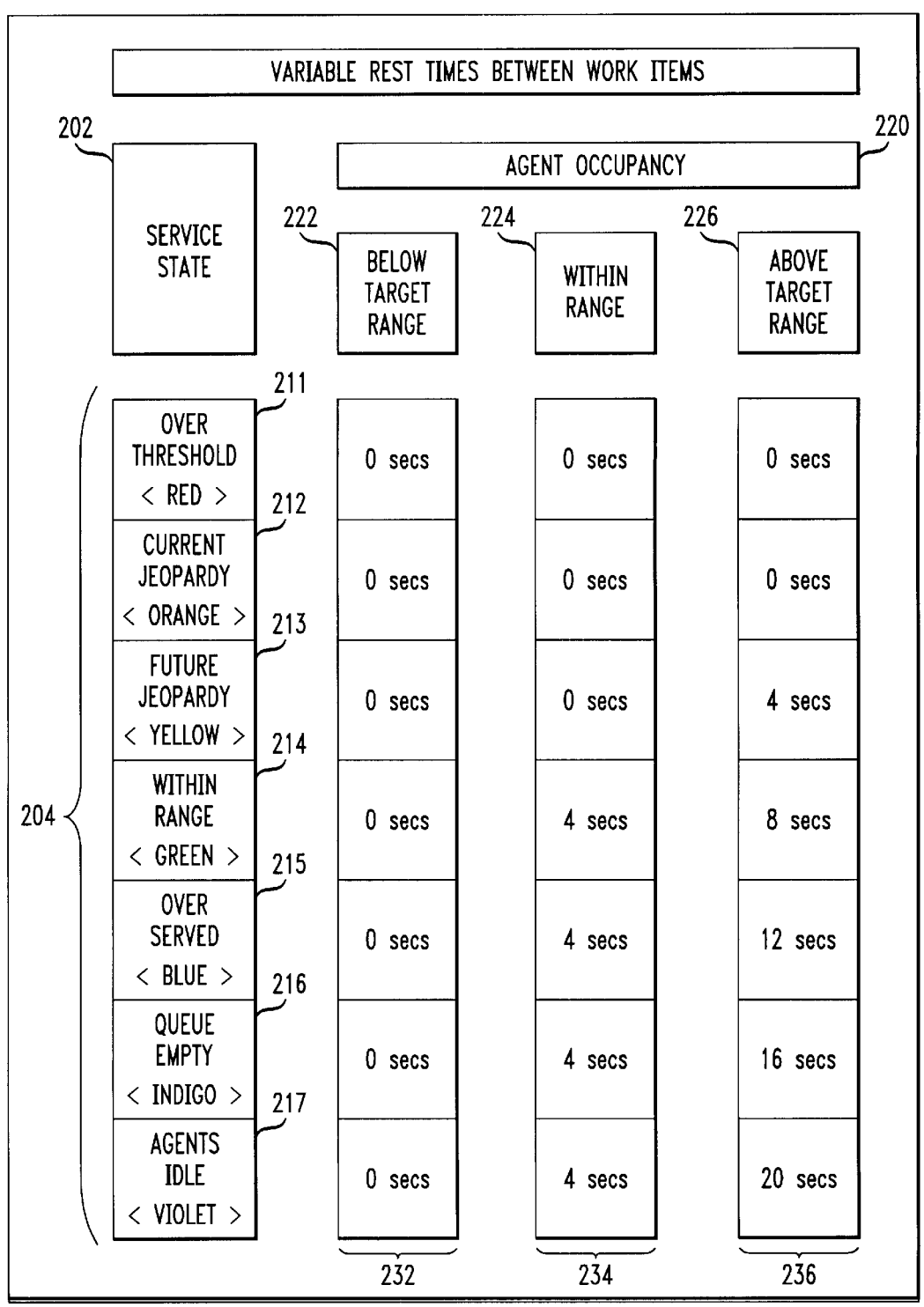
FIG. 3 is a diagram illustrating the provision of variable rest periods based on service state in accordance with one aspect of the present invention.

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc. The term "call center" as used herein is thus intended to include any type of ACD system, telemarketing system or other communication system which processes calls or other service requests, including voice calls, video calls, multi-media calls, e-mail, faxes, text chat or voice messages as well as various portions or combinations of these and other types of communications. The term "call" as used herein is intended to include any of the above-noted types of communications as well as portions or combinations of these and other communications.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage or e-mails, faxes and other communications.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels.

Call vectoring is described in greater detail in Definity® Communications System Generic 3 Call Vectoring/Expert Agent Selection (EAS) Guide, AT&T Publication No. 555-230-520, Issue Nov. 3, 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 issued May 18, 1999 in the name of inventors A. D. Flockhart et al. and entitled "Waiting-Call Selection Based on Anticipated Wait Times," and U.S. Pat. No. 6,192,122 issued Feb. 20, 2001 in the name of inventors A. D. Flockhart et al. and entitled "Call Center Agent Selection that Optimizes Call Wait Times," both of which are incorporated by reference herein.

In accordance with the present invention, the call center of FIG. 1 is configured to include capabilities for implementing one or more of the following features: variable rest periods, many-to-many work assignment, just-in-time (JIT) delivery of work, and a next opportunity for service (NOS) process. Each of these distinct aspects of the present invention will be described in greater detail below.

A first aspect of the invention provides variable rest periods based at least in part on factors such as call center service state and agent occupancy. Variable rest periods in accordance with the invention are determined utilizing a set of rules, with call center service states as a reference in activating the rules. Agents are thus provided with rest breaks in between calls even when calls are in queue in order to improve agent fairness in terms of workload and reduce agent burn-out, which as previously noted can result in less efficient or effective agent performance.

FIG. 3 shows a diagram 200 illustrating a variable rest period technique in accordance with the invention. As will be described in greater detail below, this technique allows for variable rest periods between work items for agents in a call center.

Associated with the flow diagram 200 of FIG. 3 is a service state indicator 202. The service state indicator 202 may take on any of the service states shown in a set of service states 204. Each of the service states in the set 204 represents a particular service status for a particular skill or type of call. It should be noted that the term "skill" as used herein is intended to include any type of work task that may be handled in a call center. Although the illustrative embodiment described below refers to service states associated with a particular skill, it will be apparent to those skilled in the art that the techniques are also applicable to particular types of calls or other communications.

In this example, the set of service states 204 includes an Over Threshold state 211, a Current Jeopardy state 212, a Future Jeopardy state 213, a Within Range state 214, an Over Served state 215, a Queue Empty state 216, and an Agents Idle state 217. Each of the states is associated with a particular display color, in order to facilitate interpretation of the information by a call center manager, agent, etc. More particularly, service states 211 through 217 are associated with the colors red, orange, yellow, green, blue, indigo and violet, respectively.

It should be noted that the particular number and arrangement of service states shown in FIG. 3 is by way of example only, and other embodiments could include more or fewer states. For example, another possible arrangement may include a Critical state, an Above Range state, a Jeopardy state, a Future Jeopardy state, a Within Range state, a Below Range state, a Queue Empty state, and an Agents Available state. The Critical state in such an arrangement may correspond to a state in which, e.g., an Oldest Call Waiting (OCW) measure is greater than a specified upper threshold. In addition, other types of color schemes could be used in conjunction with the various service states.

A given one of the states in the set of service states 204, i.e., the Within Range state 214, represents a branded range. This branded range may be, e.g., a branded range of wait time that the call center wants to deliver consistently for a particular skill. A more particular example of such a branded range is, e.g., 6 to 20 seconds of wait time for answering an incoming call. Other states in the set of service states 204 represent wait times above the branded range, i.e., underserved conditions, and below the branded range, i.e., overserved conditions. Appropriate rules can be enabled so as to ensure that as many calls as possible are answered within the branded range, to shorten waits that are longer than the branded range, and to minimize the number of calls handled outside of the branded range. The service states may be based on, e.g., a waiting time measure, an average speed of answer (ASA) measure, a percent in service level, or other measures as well as combinations of such measures.

The diagram 200 includes designated sets of service state-based variable rest periods in three different categories of agent occupancy 220. These three categories include a below target range category 222, a within range category 224, and an above target range category 226, each of which may be associated with a particular range of values of a designated agent occupancy metric. Each of the three categories 222, 224 and 226 includes a corresponding set of rest periods 232, 234 and 236, with each of the sets of rest periods including a specified rest period for each of the possible service states 211 through 217.

In this example, the rest periods for the below target range agent occupancy category 222 are all set to 0 seconds, indicating that there are no rest periods when the value of the agent occupancy metric is in this category. The rest periods for the within range agent occupancy category 224 vary in accordance with the service state, e.g., the designated rest periods in this category are 0, 0, 0, 4, 4, 4 and 4 seconds for the service states 211, 212, 213, 214, 215, 216 and 217, respectively. This means that an agent may be given, e.g., a 4 second rest period after completing the current call if the worst-case call center service state for the skills served by that agent is Within Range 214 or better, or a 0 second rest period, i.e., no rest period, if the worst-case call center service state for the skills served by the agent is Future Jeopardy 213 or worse. The rest periods for the above target range agent occupancy category 226 also vary in accordance with the service state, e.g., the designated rest periods in this category are 0, 0,4, 8, 12, 16 and 20 seconds for the service states 211,212, 213, 214, 215, 216 and 217, respectively. This means that an agent may be given, e.g., a 12 second rest period after completing the current call if the worst-case call center service state for the skills served by the agent is Over Served 215, or a 0 second rest period, i.e., no rest period, if the worst-case call center service state for the skills served by the agent is Current Jeopardy 212 or worse.

The variable rest period determination illustrated in FIG. 3 therefore determines, when a given agent completes a current call or otherwise becomes available (including the completion of any required wrap-up activity or other after-call work), the call center service states for the skill or skills the agent serves. A rest period is then granted based both on the agent occupancy category 222, 224 or 226, and the worst-case call center service state of the various skills the agent serves. Rest periods will thus generally be longer if the agent is more overworked relative to peers or to a set threshold or range, and will be longer if the service states for the skills the agent serves are closer to over-serviced states.

When an agent is granted a rest period as determined in accordance with the above-described rules, the agent may be provided with a notification indicating that such a rest period has been granted and the duration of the rest period. It is possible for the rest period to be curtailed due to a circumstance such as a problematic caller wait time appearing in the interim. In addition, agent breaks, such as those already scheduled in a call center, might be moved forward or appended on to a rest period determined by the above-described rules. These rules can of course also apply to work tasks other than traditional voice calls, such as email, fax, text chat, etc. for which service states are defined and predicted, or simply defined and measured.

It should also be noted that in an alternative embodiment, the rest periods could be determined using only the agent occupancy category, or only the service state of the one or more skills the agent handles. As previously noted, there may be no predictive component in certain applications.

In addition, the above-described rest periods determined for a given skill service state can be further adjusted based on factors such as target occupancy. For example, an adjusted rest period may be computed as the sum of a skill service state rest period and a function of target occupancy in percent, as follows:

skill service state rest period+1/2(current % occupancy−target % occupancy).

In this example, for every 2% over the target occupancy, one additional second is added to the skill service state rest period. Similarly, for every 2% under the target occupancy, one second is removed from the rest period. Numerous other adjustments of this type can be made, based on target occupancy or other factors, as will be apparent to those skilled in the art.

In accordance with a second aspect of the invention, a many-to-many work assignment process is provided. The many-to-many work assignment process implements assignments between many agents and many work assignments, as opposed to the conventional one-to-many or many-to-one processes described previously.

The many-to-many work assignment process of the present invention in an illustrative embodiment determines precisely which agents will become available in the near future so that decisions can be made based on a known pool of agents assigned in various ways to the known body of callers in queue. This precise knowledge regarding when agents are available for the next call may be based at least in part on information relating to variable rest periods granted to those agents in the manner previously described. The process creates a buffered pool of agents by slightly delaying the work assignment decision such that multiple agents can be considered simultaneously for multiple calls.

Examples of the work assignment considerations that can be made in this many-to-many assignment process are the following:

1. Optimum assignment of agents dedicated to particular callers in queue.
2. Optimum use of rare skills held by the agents in the pool.
3. Optimum achievement against branded service targets.
4. Caller treatment changes, including announcements that let callers know that a pre-assigned agent will be with them in X seconds.
5. Better achievement in efforts to create equal and reasonable workloads.
6. Better achievement in efforts to provide a predefined mix of calls to any particular agent.

As a more particular example of the many-to-many work assignment process in accordance with the invention, consider a situation in which a particular set of agents, e.g., Agent 1, Agent 2 and Agent 3, become available in sequential order after designated rest periods. Applying a conventional many-to-one process to this situation, calls queued for service requiring particular skills, e.g., Skill A, Skill B and Skill C, may be assigned such that Agent 1 handles the next call in queue for Skill A, Agent 2 handles the next call in queue for Skill B, and Agent 3 handles the next call in queue for Skill C. Using the many-to-many work assignment process, however, it is possible to consider other factors which may dictate the assignment of a particular agent to a particular call. For example, if Agent 1 is particularly proficient at Skill C and it is known that another agent will be coming available to handle the call queued for Skill A, the many-to-many assignment process may assign the agents to the calls such that Agent 1 handles the next call in queue for Skill C, Agent 2 handles the next call in queue for Skill B, and Agent 3 handles the next call in queue for Skill A. This type of assignment can provide a better utilization of call center resources than the many-to-one process previously described.

Advantageously, a many-to-many work assignment process in accordance with the invention allows for more extensive optimization of call center operations by incorporating information on precisely-known future events pertaining to multiple work items and multiple agents. More particularly, by moving away from the conventional one-to-many or many-to-one approaches with single decisions made in real time to groups of decisions made in quasi-real time, this aspect of the invention allows better alignment of call center operations with various goals.

A third aspect of the present invention relates to just-in-time (JIT) delivery of work within a call center. This aspect of the invention provides a technique which allows work to be delivered to an assigned agent to arrive "just in time" for the agent's availability to work on it, thereby reducing or eliminating the delay incurred by an available agent waiting for the work after the agent becomes available.

The JIT delivery process uses knowledge of an agent's upcoming availability as an event which triggers a series of other events leading up to that availability. The other events in an illustrative embodiment can start with a call selection, to determine what kind of work the agent will do upon becoming available. From this decision, it is known whether a remote call must be delivered to the agent's station and how long that connection may take to establish. The amount of time needed to obtain any data associated with the call can also be determined. The fetching of the data and the connecting of the call can then be scheduled so that their completions approximately coincide with the agent's next known availability.

The knowledge of the agent's upcoming availability may be based at least in part on a known rest period assigned to that agent in accordance with the previously-described variable rest period process, since assigning a rest period of known length creates as a result a known, future availability event. For example, assume that an agent is known to be in a rest period that will end in 10 seconds. The call selection may be scheduled for 6 seconds prior to the end of the rest period, such that call selection executes at 4 seconds into the rest period. Assume then that the call selection assigns a call queued at a remote site to this agent, and the data for this call is also in a remote server. The data retrieval may then be scheduled to take place 5 seconds before the rest period ends, and the call connection may be scheduled to execute 2 seconds before the rest period ends. The call and the data associated with the call then arrive coincident to the end of the agent's rest period.

Advantageously, this aspect of the invention eliminates unnecessary agent delay in cases which include elements such as data retrieval and call connection, by scheduling the retrieval or connection to coincide with the agent's availability.

It will be apparent to those skilled in the art that this technique, like the other call processing techniques described herein, is applicable to call center work tasks other than voice calls.

A fourth aspect of the present invention relates to a technique for providing "next opportunity for service" or NOS, i.e., a known, future point in time at which a work item, such as a call, queued for service could be serviced next. As previously noted, the above-described techniques for providing a rest period of variable length create a known future event of availability. This known future availability can be used to define a NOS. More particularly, any time an agent is in a variable rest period, for each of the skills the agent handles, there is a NOS.

Given that many agents can be in a variable rest period at the same time, an NOS time line can be generated for any skill or type or work in the call center. This knowledge can be incorporated into evaluating the consequences of using an agent for any of the particular skills the agent holds. For example, the NOS time line for a given skill can be used to determine how many opportunities there will be to service a call prior to an pre-defined objective wait time for that type of call. Also, a number of different NOS time lines could be displayed together in a designated arrangement, with appropriate color coding or similar differentiation techniques used to indicate individual agents associated with the time lines.

An NOS in accordance with the invention is generally not considered a guaranteed time at which a particular call will be served, but instead serves as an indication of the next point in time at which the call will be considered for service. However, it could be viewed as a guaranteed time in certain limited circumstances, e.g., if the agent whose rest period is used to derive the NOS is a single-skilled agent and does not become unavailable for another reason in the interim. In addition, the NOS could be reported in real time, perhaps along with a periodically refreshed or reported measure such as Weighted Advance Time (WAT), in order to provide a call center manager with foresight on how calls may be served in the very near future.

It should be understood that the above-described variable rest period, many-to-many work assignment, JIT delivery of work and NOS techniques are not limited to use with voice calls, but are instead more generally applicable to any work tasks that arrive from a customer, e.g., e-mail, fax, text chat, voice over IP, etc., as well as to workflow and/or customer fulfillment generated work tasks that are part of, e.g., a workflow system in which various work tasks dealing with actual or electronic "paperwork," contacts with customers, approvals, etc. that must be completed in order to fulfill a specified customer need.

A call center configured in accordance with the invention may be distributed over multiple sites. For example, the processing operations described above may be performed in a remote or centralized system before a given call or other communication is delivered to an available agent at a particular local site.

The above-described embodiments of the invention are intended to be illustrative only. For example, it should be noted that the exemplary configuration of the call center shown in FIG. 1 may be altered to incorporate a wide variety of different arrangements of components to provide the processing functions described herein. One such alternative arrangement may be configured such that the processing functions described herein are implemented in a so-called "off-board" server, e.g., a server outside of an ACD system. In this type of arrangement, one or more servers control the distribution of work to agents in an enterprise, such that the processing functions related to distribution can be moved in whole or in part from the ACD system to the servers. The term "call center" as used herein is intended to include these and other alternative systems in which the present invention can be implemented.

In addition, as previously noted, the invention can be applied to a wide variety of communications other than calls, including faxes, e-mails, text chat, voice over IP, etc. It should also be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to provide communication processing operations in accordance with the invention. These and numerous other alternative embodiments within the scope of the following claims will be apparent to those skilled in the art.

What is claimed is:

1. A method of processing communications in a call center, the call center providing for a given agent, in addition to scheduled breaks, variable rest periods for the given agent between servicing of communications by that agent, the method comprising the steps of:

determining a rest period for the given agent, based at least in part on one or more of (i) an agent occupancy level and (ii) which of a plurality of designated service states is associated with at least one of a particular skill and a particular type of communication supported by the agent, a set of rest periods being associated with each of the service states and including at least one specified rest period for each of a plurality of agent occupancy levels, a given one of the rest periods thereby being determinable based on agent occupancy level and service state, wherein the plurality of service states comprise at least first, second and third service states corresponding to a first service level, a second service level representative of an over-service condition relative to the first service level, and a third service level representative of an under-service condition relative to the first service level, respectively; and processing the communications in the call center such that communications are not handled by the given agent for at least a portion of the determined rest period.

2. The method of claim 1 wherein at least a subset of the service states are characterized at least in part by at least one of a waiting time measure, an average speed of answer measure, and a percent in service level.

3. The method of claim 1 wherein the agent occupancy levels comprise one or more of a below target range level, a within range level, and an above target range level.

4. The method of claim 1 wherein the plurality of designated service states comprises two or more of an over threshold state, a current jeopardy state, a future jeopardy state, a within-range state, an over served state, a queue empty state and an agents idle state, wherein the within range state is representative of the particular service level.

5. The method of claim 1 wherein the rest period is determined for the given agent based on both the agent occupancy level and at least one of the service states for one or more skills supported by the agent.

6. The method of claim 5 wherein the particular one of the service states corresponds to a worst-case one of the service states for a plurality of skills supported by the agent.

7. The method of claim 1 wherein a different set of rest periods is associated with each of the service states for each of the plurality of agent occupancy levels, such that the rest period is determined for the given agent by determining a particular agent occupancy level and a worst-case service state among the service states corresponding to skills supported by the agent.

8. The method of claim 1 wherein the determining step further includes adjusting a selected rest period based at least in part on a difference between a target occupancy and an actual occupancy for the given agent.

9. The method of claim 1 wherein the determining step further includes determining rest periods for a plurality of agents associated with the call center.

10. The method of claim 9 wherein the rest periods determined for the plurality of agents are utilized to implement a many-to-many work assignment process in which multiple agents are each considered simultaneously for handling multiple communications.

11. The method of claim 1 wherein the determined rest period for the given agent is used to determine a precise time of future availability of that agent.

12. The method of claim 11 wherein the precise time of future availability of the agent as determined based on the rest period is used to schedule at least one event prior to delivery of a particular communication to that agent.

13. The method of claim 12 wherein the at least one event comprises at least one of a call selection event, a data retrieval event and a call connection event.

14. The method of claim 12 wherein the at least one event is scheduled such that data required to process the particular communication is provided to the agent substantially simultaneously with the communication.

15. The method of claim 11 wherein the precise time of future availability of the agent is used to determine a next opportunity for service (NOS) indicator for each of at least a subset of the skills supported by the agent.

16. The method of claim 15 wherein NOS indicators are generated for a plurality of agents associated with the call center.

17. The method of claim 16 wherein the NOS indicators for at least a subset of the plurality of agents associated with the call center are arranged in a visual display comprising a time line of NOS indicators for a given skill supported by the agents.

18. The method of claim 17 wherein the visual display comprises a plurality of NOS time lines each including NOS indicators for a particular skill supported by at least a subset of the agents.

19. An apparatus for processing communications in a call center, the call center providing for a given agent, in addition to scheduled breaks, variable rest periods for the given agent between servicing of communications by that agent, the apparatus comprising:

a processor operative to determine a rest period for the given agent, based at least in part on one or more of (i) an agent occupancy level and (ii) which of a plurality of designated service states is associated with at least one of a particular skill and a particular type of communication supported by the agent, a set of rest periods being associated with each of the service states and including at least one specified rest period for each of a plurality of agent occupancy levels, a given one of the rest periods thereby being determinable based on agent occupancy level and service state, wherein the plurality of service states comprise at least first, second and third service states corresponding to a first service level, a second service level representative of an over-service condition relative to the first service level, and a third service level representative of an under-service condition relative to the first service level, respectively, such that communications are not handled by the given agent for at least a portion of the determined rest period; and a memory coupled to the processor and operative to store information regarding at least one of the agent occupancy level and the service states.

20. The apparatus of claim 19 wherein at least a subset of the service states are characterized at least in part by at least one of a waiting time measure, an average speed of answer measure, and a percent in service level.

21. The apparatus of claim 19 wherein the agent occupancy levels comprise one or more of a below target range level, a within range level, and an above target range level.

22. The apparatus of claim 19 wherein the plurality of designated service states comprises two or more of an over threshold state, a current jeopardy state, a future jeopardy state, a within-range state, an over served state, a queue empty state and an agents idle state, wherein the within range state is representative of the particular service level.

23. The apparatus of claim 19 wherein the rest period is determined for the given agent based on both the agent occupancy level and at least one of the service states for one or more skills supported by the agent.

24. The apparatus of claim 23 wherein the particular one of the service states corresponds to a worst-case one of the service states for a plurality of skills supported by the agent.

25. The apparatus of claim 19 wherein a different set of rest periods is associated with each of the service states for each of the plurality of agent occupancy levels, such that the rest period is determined for the given agent by determining a particular agent occupancy level and a worst-case service state among the service states corresponding to skills supported by the agent.

26. The apparatus of claim 19 wherein a selected rest period is adjusted based at least in part on a difference between a target occupancy and an actual occupancy for the given agent.

27. The apparatus of claim 19 wherein the processor is further operative to determine rest periods for a plurality of agents associated with the call center.

28. The apparatus of claim 27 wherein the rest periods determined for the plurality of agents are utilized to implement a many-to-many work assignment process in which multiple agents are each considered simultaneously for handling multiple communications.

29. The apparatus of claim 19 wherein the determined rest period for the given agent is used to determine a precise time of future availability of that agent.

30. The apparatus of claim 29 wherein the precise time of future availability of the agent as determined based on the rest period is used to schedule at least one event prior to delivery of a particular communication to that agent.

31. The apparatus of claim 30 wherein the at least one event comprises at least one of a call selection event, a data retrieval event and a call connection event.

32. The apparatus of claim 30 wherein the at least one event is scheduled such that data required to process the particular communication is provided to the agent substantially simultaneously with the communication.

33. The apparatus of claim 29 wherein the precise time of future availability of the agent is used to determine a next opportunity for service (NOS) indicator for each of at least a subset of the skills supported by the agent.

34. The apparatus of claim 33 wherein NOS indicators are generated for a plurality of agents associated with the call center.

35. The apparatus of claim 34 wherein the NOS indicators for at least a subset of the plurality of agents associated with the call center are arranged in a visual display comprising a time line of NOS indicators for a given skill supported by the agents.

36. The apparatus of claim 35 wherein the visual display comprises a plurality of NOS time lines each including NOS indicators for a particular skill supported by at least a subset of the agents.

37. An article of manufacture containing one or more software programs for processing communications in a call center, the call center providing for a given agent, in addition to scheduled breaks, variable rest periods for the given agent between servicing of communications by that agent, wherein the one or more software programs, when executed in a processor, cause the processor to perform the steps of:

determining a rest period for the given agent, based at least in part on one or more of (i) an agent occupancy level and (ii) which of a plurality of designated service states is associated with at least one of a particular skill and a particular type of communication supported by the agent, a set of rest periods being associated with each of the service states and including at least one specified rest period for each of a plurality of agent occupancy levels, a given one of the rest periods thereby being determinable based on agent occupancy level and service state, wherein the plurality of service states comprise at least first, second and third service states corresponding to a first service level, a second service level representative of an over-service condition relative to the first service level, and a third service level representative of an under-service condition relative to the first service level, respectively; and processing the communications in the call center such that communications are not handled by the given agent for at least a portion of the determined rest period.

* * * * *